Dec. 13, 1949 W. E. NORVELL 2,490,831
ADJUSTABLE BOLTER DRIVE
Filed Jan. 29, 1947 2 Sheets-Sheet 1

INVENTOR
WILLIAM E. NORVELL
BY Alfred R. Fuchs
ATTORNEY

Dec. 13, 1949 W. E. NORVELL 2,490,831
ADJUSTABLE BOLTER DRIVE
Filed Jan. 29, 1947 2 Sheets-Sheet 2
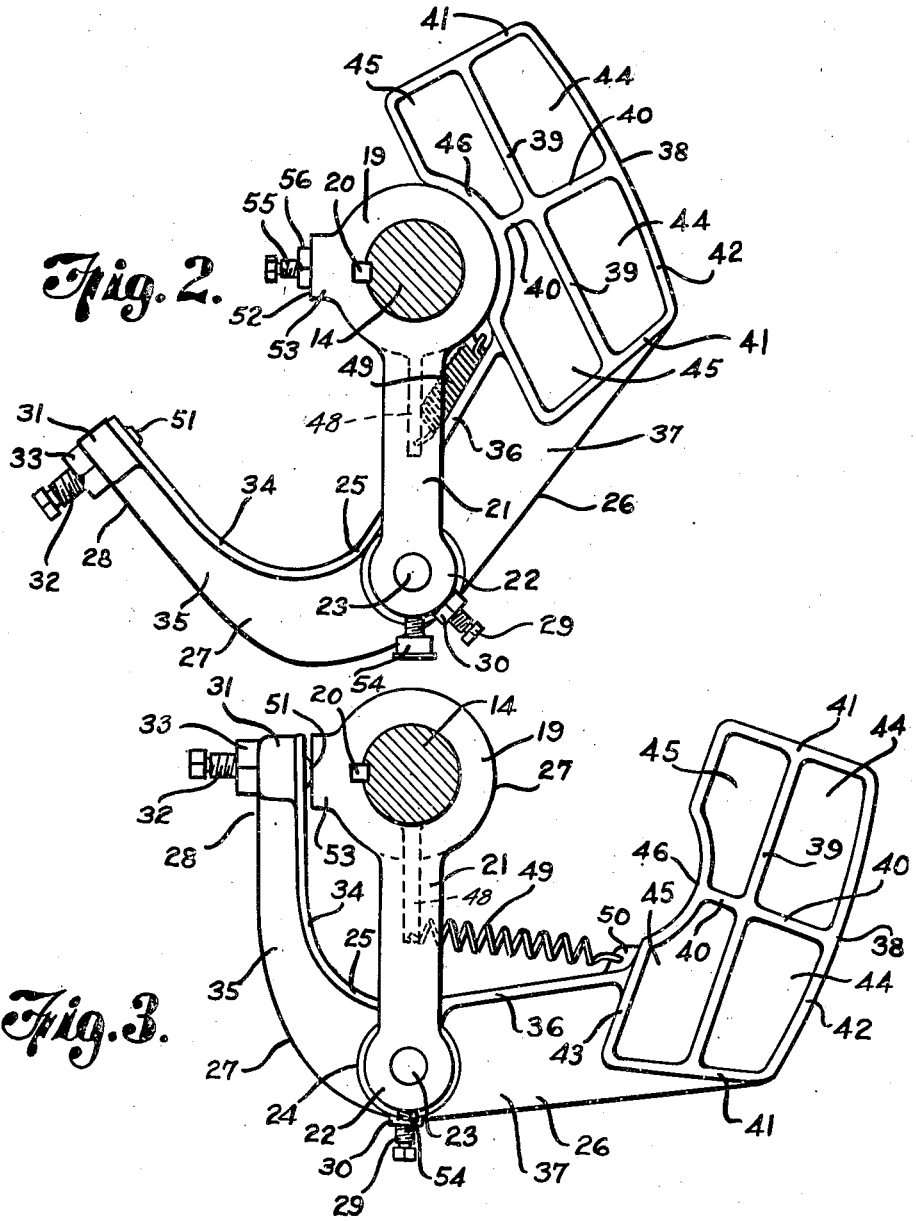
INVENTOR
WILLIAM E. NORVELL
BY Alfred R. Fuchs
ATTORNEY Patented Dec. 13, 1949

2,490,831

UNITED STATES PATENT OFFICE 2,490,831

ADJUSTABLE BOLTER DRIVE

William E. Norvell, Kansas City, Mo.

Application January 29, 1947, Serial No. 725,021

6 Claims. (Cl. 74—87)

My invention relates to bolters, and more particularly to a drive for bolters, and is an improvement over my Patent No. 2,374,451, Patented April 24, 1945.

While it is desirable to provide a gyratory motion to the bolter body containing the sieves in flour sifters or bolters, and to provide means for varying the rate and radius of gyration for different materials that are to be separated, difficulty has been encountered in starting a bolter to prevent a swinging movement of the bolter body on its mounting in a circle much greater than that of the true gyratory motion that is desired. In my above referred to patented bolter drive it is possible to obtain a very fine and accurate adjustment of the radius of gyration to get the desired bolting action, but the undesirable swinging motion above referred to is sometimes encountered before the true gyratory motion develops. This gyratory motion can only develop after the bolter reaches a predetermined speed and will, of course, be maintained during the operation of the device when the operating speed of the bolter is reached.

It is the principal purpose of my invention to provide new and improved means for producing a gyratory motion in a bolter that is not only readily adjustable so as to produce a gyration of the bolter of any desired radius and which is readily adjustable to that radius and can be very closely and accurately adjusted to obtain the radius of gyration desired, but which is of such a character that the above referred to swinging motion is entirely avoided.

More specifically it is a purpose of my invention to provide a bolter in which the desired gyratory motion is obtained by means of eccentrically mounted rotatable weighted members, which, after attaining their desired rate of rotation, set up a gyratory motion of the desired radius of gyration of the bolter, which eccentrically mounted rotatable weighted members are variable in their eccentricity during the operation of the bolter so that when the bolter is started in operation and before it attains a predetermined speed the center of mass of the rotatable means will be adjacent the axis of rotation and will move away from the axis of rotation into a desired position spaced therefrom under the influence of the centrifugal force of the rotatable means upon said rotatable means attaining a predetermined speed, thus eliminating the swinging motion at low speeds of the bolter that would otherwise take place, but maintaining the desired eccentricity of the weight of the rotatable means to obtain the desired gyratory action after this speed has been attained and at the normal operating speeds of the bolter when in use.

Specifically my improved means for providing this variable eccentricity of the mass of the rotatable means comprises a pair of rotatable members, which are mounted above and below the bolter body on a common axis of rotation, each of which includes a weighted member that is so mounted that the same will move from an inner position adjacent said axis of rotation to an outer position, which is the normal operating position therefor for producing the gyratory motion.

Stop means is provided for limiting both the inward and the outward movement of the weighted means relative to the axis of rotation, and said stop means comprises adjustable means whereby the close adjustment of the center of mass of each of said rotatable members relative to the axis of rotation during normal operation of the bolter can be obtained. Preferably, each of the rotatable members is provided with a weighted member that is pivotally mounted so as to be movable between an inner and an outer position relative to the axis of rotation of the said rotatable member, and with resilient means for holding the weighted member in its innermost position until the centrifugal force resulting from a predetermined speed of the rotatable member being attained overcomes the force of said spring and moves the weighted member into its outermost position where the same engages a stop member which is adjustable to vary the outermost position of said pivoted weighted means. Preferably, the rotatable means above and rotatable means below the bolter body are adjusted to the same position to balance the eccentricity of the weight located above and below the bolter, thus avoiding any stress on the bolter itself or the mountings due to the provision of the eccentric means.

It is another purpose of my invention to provide in a bolter drive of the above mentioned character, means whereby the bolter shaft and a drive shaft aligned substantially with the axis of gyration of the bolter body are so connected that the relative position of said shafts can be adjusted so that the drive shaft will lie truly on the axis of gyration, thus avoiding any undesirable stresses on the drive shaft.

Other objects and advantages of my invention will appear as the description of the drawings proceeds. I desire to have it understood, however, that I do not intend to limit myself to the particular details shown or described, except as defined in the claims.

In the drawings:

Fig. 2 is a plan view of one of the rotatable members for producing the gyratory motion in the position of the parts when the bolter is stationary or operating at low speed during the starting operation thereof, the bolter shaft being shown in section.

Fig. 3 is a view similar to Fig. 2 of said rotatable means in the position it assumes upon the bolter reaching a predetermined speed and during normal operation of the bolter.

Figure 1:
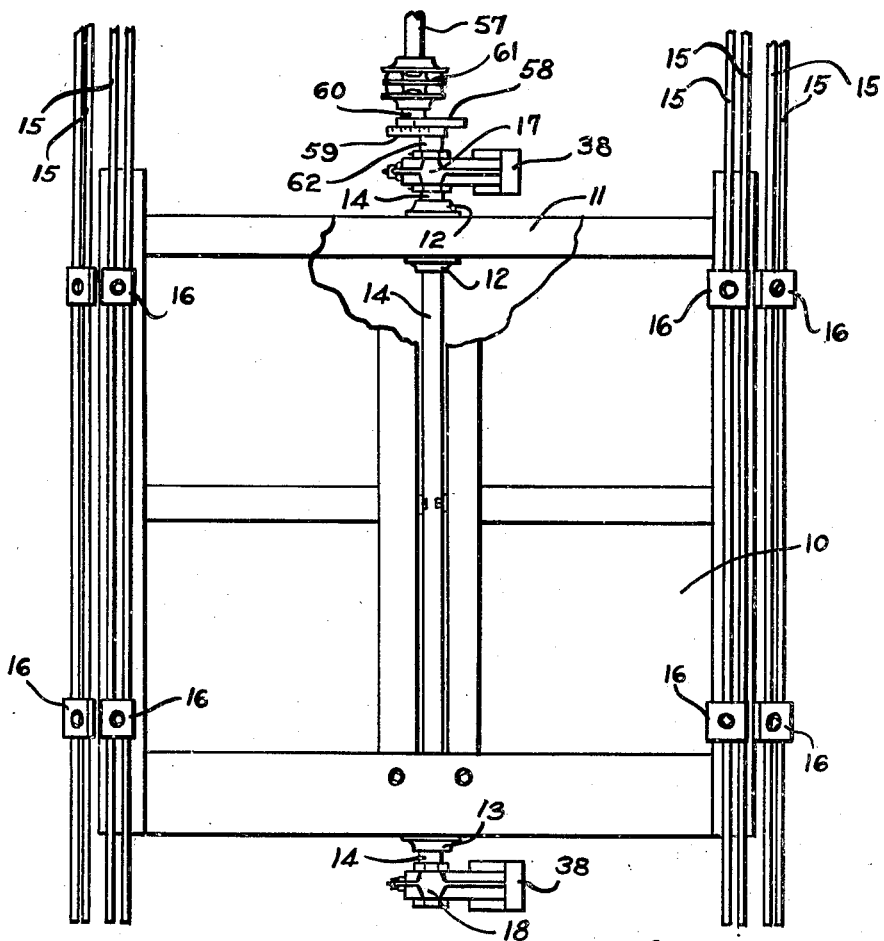
Fig. 1 is a side elevation of a bolter to which my improved driving means is applied, the supporting means for the bolter and the drive shaft being partly broken away.
Figure 4:
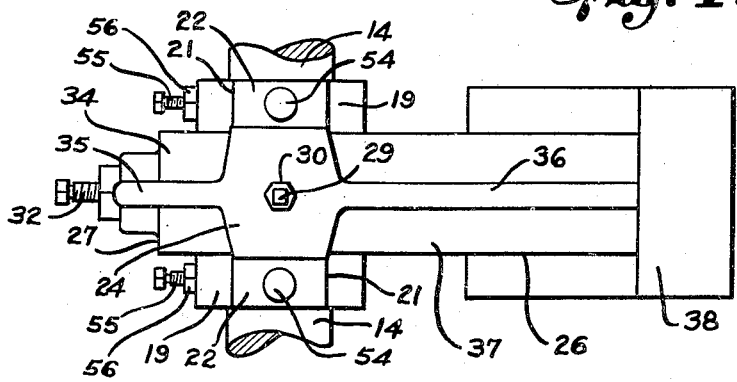
Fig. 4 is a fragmentary side elevational view on an enlarged scale of one of said rotatable members and portions of the bolter shaft upon which the same is mounted.

Referring in detail to the drawings, my bolter comprises a body portion 10, which may be of conventional construction as far as its general arrangement is concerned, and which contains the sieves that are usually provided in bolters. Said body portion may be provided with a frame including horizontal members 11, upon which the bearings 12 and 13 of the shaft 14 are mounted, said shaft 14 being the bolter shaft and extending vertically of the bolter body and being located substantially centrally thereof.

The bolter body is mounted so as to be capable of a gyratory motion, being flexibly supported, preferably, by means of a plurality of wood reeds 15, which are provided substantially at the corners of the bolter body in the manner illustrated in my Patent No. 2,374,451. Said reeds are securely fastened to the bolter body in any suitable manner, as by means of the clamps 16, the reeds 15 being supported from a suitable support above the bolter body, which is not shown, in any suitable manner, so that the bolter body is suspended from the reeds 15, which will flex readily to permit the gyratory motion that is desired of said bolter but will constrain said motion within certain limits.

A pair of rotatable members 17 and 18 are mounted on the shaft 14, one adjacent the top of the body 10 and the other adjacent the bottom of the body 10. Each of the rotatable members is of a similar character and are, preferably, duplicates of each other. Each of said rotatable members is provided with a hub portion 19, which is fixed on the shaft 14 in any suitable manner, as by means of a key 20. Said hub portion is provided with a pair of arms 21 which terminate in bearing enlargements 22, within which the pivot pin 23 is rotatably mounted.

Fixed in position on the pivot member 23 between the two enlargements 22 on the arms 21 is the hub portion 24 of a lever 25, which is generally of the shape of a bell crank having an arm 26 extending from one side of the pivot 23 and an arm 27 extending from the other side thereof, said arm 27 being curved to have the end 28 thereof extending substantially perpendicularly to the arm 26 of said lever. Any suitable means for fixing the hub portion 24 on the pin 23, such as the set screw 29 and the lock nut 30, may be provided.

The extremity of the arm 27 is provided with a boss 31 thereon, which is internally threaded to receive a screw-threaded member 32 that serves as an adjustable stop member and which is locked in adjusted position, with any desired amount of the screw-threaded member extending outwardly from the inner face of the arm 27, by means of the lock nut 33. The arm 27 comprises a wide flange 34 and a stiffening rib 35, while the arm 26 also has a continuation 36 of said wide flange and a stiffening rib 37 that is a continuation of the stiffening rib 35.

Formed integrally with the arm 26 is a large box-like housing 38, which is provided with a plurality of transverse walls 39 and 40 and marginal walls 41, 42 and 43 that define a plurality of pockets 44 and 45 which are filled with lead or similar material to a desired extent to provide a weight of the desired amount at the end of the arm 26 of the lever 25 that is remote from the pivot 23. The inner face of the housing 38 is provided with a concave wall portion 46 that is of the same curvature as the outer surface 47 of the hub portion 19, the outer surface 47 of said hub portion and the concave surface 46 of the housing 38 serving as cooperating stop means to limit the inward movement of the weighted end of the lever 25 to the position shown in Fig. 2.

A connecting web portion or flange 48 is provided between the arms 21 on the hub portion 19 extending outwardly a suitable distance from the hub portion to provide means for securing one end of a coil tension spring 49 thereto, the other end of said spring being secured to a lug 50 projecting from the flange 36 adjacent the housing 38, said spring having a tendency to hold the parts in the position shown in Fig. 2 until sufficient centrifugal force is exerted on the lever by means of the weight provided in the housing 38 to overcome the resistance of said spring. The spring is of such strength relative to the weight on the end of the arm 26 of the lever that after a predetermined speed is attained that is such that any undesirable swinging motion of the bolter body will no longer take place, the centrifugal force will move the arm with the weight in an outward position away from the hub 19 and expand the spring 49 to an extent determined by the position of the stop member 32.

The stop member 32 has its inner end 51 projecting from the inner face of the flange 34 a distance to adjust the position of the weight at the desired spacing from the axis of the shaft 14 to get the desired gyratory motion of the bolter when it has reached its normal speed, this being accomplished by engagement of the stop member 51 with the flat face 52 of the stop projection 53 on the hub 19. Grease cups 54 are, preferably, provided for lubricating the pivotal connection between the members 23 and the bearing enlargement 22. The hub portion 19 is also, preferably, provided with additional holding means for securing the same to the shaft comprising the set screws 55 and the lock nuts 56.

It will be obvious that the unbalanced condition of the rotating system made up of the rotatable members 17 and 18, which are, preferably, duplicates, and which are, preferably, in axial alignment with each other, will vary in accordance with the position of the weighted members provided by the weighting material in the pockets or recesses 44 and 45 of the housing 38, which is determined by means of the rate of rotation of the shaft 14, the strength of the spring 49 and the position of the inner end 51 of the stop member 32 relative to the arm 28 of the lever 25. Thus when the bolter is first started the shaft 14 gradually increases in speed, the center of mass of the rotating system will be closely adjacent the axis of the shaft 14 with the stops 46 and 47 held in engagement with each other by the spring 49. As the speed of the shaft 14 increases, the lever 25 will swing on its pivotal axis until it reaches a position where the end 51 of the adjustable stop screw 32 will be in engagement with the flat face 52 of the stop 53 and will remain in such position when the shaft 14 reaches its normal rate of rotation for normal operation of the bolter, the exact position of the parts being, of course, determined by the adjustment of the screw 32 and being variable so as to obtain a fine adjustment of the unbalanced weight that is being rotated about the shaft 14 to get the desired gyratory motion of the shaft 14 and the bolter body. Preferably, the adjustment is such that the unbalanced weight creating the gyration will be the same above and below the bolter body, thus avoiding all stresses due to a lack of balance between the weight above and below said bolter body, producing a true gyratory motion about a center or axis that is parallel to the drive shaft 57.

The drive shaft 57 may be mounted in any desired manner so as to extend vertically downwardly from above the bolter and drives the shaft 14 through a driving means made up of a pair of relatively adjustable members 58 and 59, the member 58 having an upwardly extending stub shaft 60, which is connected with the shaft 57 through a universal joint 61, and the member 59 having a depending socket portion 62, which is fixed to the shaft 14 in any desired manner. The shaft 57 is thus coupled to the shaft 14 by means of the universal joint 61 and a crank of adjustable throw made up of the members 58 and 59, which are of the same construction as the adjustable crank means described in my above referred to Patent No. 2,374,451. The shaft 57 may be driven at various speeds through any suitable driving means to get various rates of rotation of the shaft 57 and the shaft 14. The stub shaft 60 and the shaft 57 are axially aligned when the crank members 58 and 59 are adjusted to the proper relative position so as to get the desired length of the crank, so that the shafts 57 and 60 will both lie on the axis of gyration of the shaft 14 and the bolter body, a suitable scale being provided on the adjustable crank means for making this adjustment. The adjustment is done after the bolter has been established in steady gyratory operation. This can be easily determined by measuring the circle of the gyratory movement by placing a piece of paper on the top of the bolter and drawing a circle on said piece of paper while the bolter is in operation, by means of a pencil or other marking means held in fixed position. The diameter of said circle will determine the radius of gyration and thus the length of the crank made up of the members 58 and 59 in a manner such as described in my above referred to patent.

Due to the provision of my self-adjusting weighted means between a position adjacent the axis of rotation of the shaft 14 and spaced a predetermined distance therefrom a bolter provided with my improved driving means will not have a wide swinging motion during the starting operation thereof, but will assume its desired gyratory motion when it gets up to normal operating speed and when properly adjusted by adjustment of the relative position of the crank members 58 and 59 the bolter will not only maintain the desired true gyratory motion, but the shaft 57 will have no strains placed thereon, as it will rotate about an axis that coincides with the axis of gyration of the bolter and of the shaft 14 and said weighted means.

What I claim is:

1. Rotatable means mounted on a flexibly suspended body for rotation about an axis to produce gyratory motion of said body, comprising an arm mounted adjacent one end thereof for rotation about said axis, a lever mounted between its ends on said arm for swinging movement about an axis spaced from said axis of rotation, weighted means on one end of said lever, stop means on the other end of said lever, cooperating stop means engaged thereby to limit movement of said weighted means away from said axis of rotation, and resilient means opposing movement of said weighted means away from said axis of rotation until said rotatable means attains a predetermined speed.

2. Rotatable means mounted on a flexibly suspended body for rotation about an axis to produce gyratory motion of said body, comprising an arm mounted adjacent one end thereof for rotation about said axis, a lever mounted between its ends on said arm for swinging movement about an axis spaced from said axis of rotation, weighted means on one end of said lever, adjustable stop means on the other end of said lever, cooperating stop means engaged thereby to limit movement of said weighted means away from said axis of rotation, and resilient means extending between the end of said lever having said weighted means and said arm between said axes to oppose movement of said weighted means away from said axis of rotation until said rotatable means attains a predetermined speed.

3. Rotatable means mounted on a flexibly suspended body for rotation about an axis to produce gyratory motion of said body, comprising an arm mounted adjacent one end thereof for rotation about said axis, a bell crank lever mounted on said arm for swinging movement about an axis spaced from said axis of rotation, weighted means on one end of said lever, stop means on the other end of said lever, cooperating stop means engaged thereby to limit movement of said weighted means away from said axis of rotation, and resilient means opposing movement of said weighted means away from said axis of rotation until said rotatable means attains a predetermined speed.

4. Rotatable means mounted on a flexibly suspended body for rotation about an axis to produce gyratory motion of said body, comprising an arm mounted adjacent one end thereof for rotation about said axis, a lever mounted between its ends on said arm for swinging movement about an axis spaced from said axis of rotation, an open ended box-like member on one end of said lever, weight producing means in said box-like member, stop means on the other end of said lever, cooperating stop means engaged thereby to limit movement of said weighted means away from said axis of rotation, and resilient means opposing movement of said weighted means away from said axis of rotation until said rotatable means attains a predetermined speed.

5. Means for producing gyratory motion of a flexibly suspended body, comprising a shaft mounted for rotation on said body, an arm mounted at one end thereof on said shaft to rotate therewith, a lever pivotally mounted on the other end of said arm, said lever having a pair of legs extending substantially perpendicularly to each other, weighted means spaced from said pivot on one of said legs, a stop member on the other of said legs and resilient means extending between points on said one leg and said arm spaced from said pivot acting to oppose movement of said weighted means away from said shaft until said shaft attains a predetermined speed.

6. Means for producing gyratory motion of a flexibly suspended body, comprising a shaft mounted for rotation on said body, an arm mounted at one end thereof on said shaft to rotate therewith, a lever pivotally mounted on the other end of said arm, said lever having a pair of legs extending substantially perpendicularly to each other, one of said legs having said pivotal mounting provided thereon near the end thereof from which the other of said legs extends, weighted means on said one leg at the outer end thereof, a stop member on the outer end of said other leg and resilient means extending between points on said one leg and said arm spaced from said pivot acting to oppose movement of said weighted means away from said shaft until said shaft attains a predetermined speed.

WILLIAM E. NORVELL.

REFERENCES CITED

The following references are of record in the file of this patent:

UNITED STATES PATENTS

| Number | Name | Date |
|---|---|---|
| 952,565 | Fraser | Mar. 22, 1910 |
| 1,217,786 | Lemaster | Feb. 27, 1917 |
| 1,323,329 | Snyder | Dec. 2, 1919 |
| 1,403,923 | Thompson | Jan. 17, 1922 |
| 2,063,509 | Lacy | Dec. 8, 1936 |
| 2,374,451 | Norvell | Apr. 24, 1945 |

FOREIGN PATENTS

| Number | Country | Date |
|---|---|---|
| 270,802 | Germany | Feb. 25, 1914 |